Inventor:
William F. Fagen
By Williams, Bradbury & Hinkle
Attorneys.

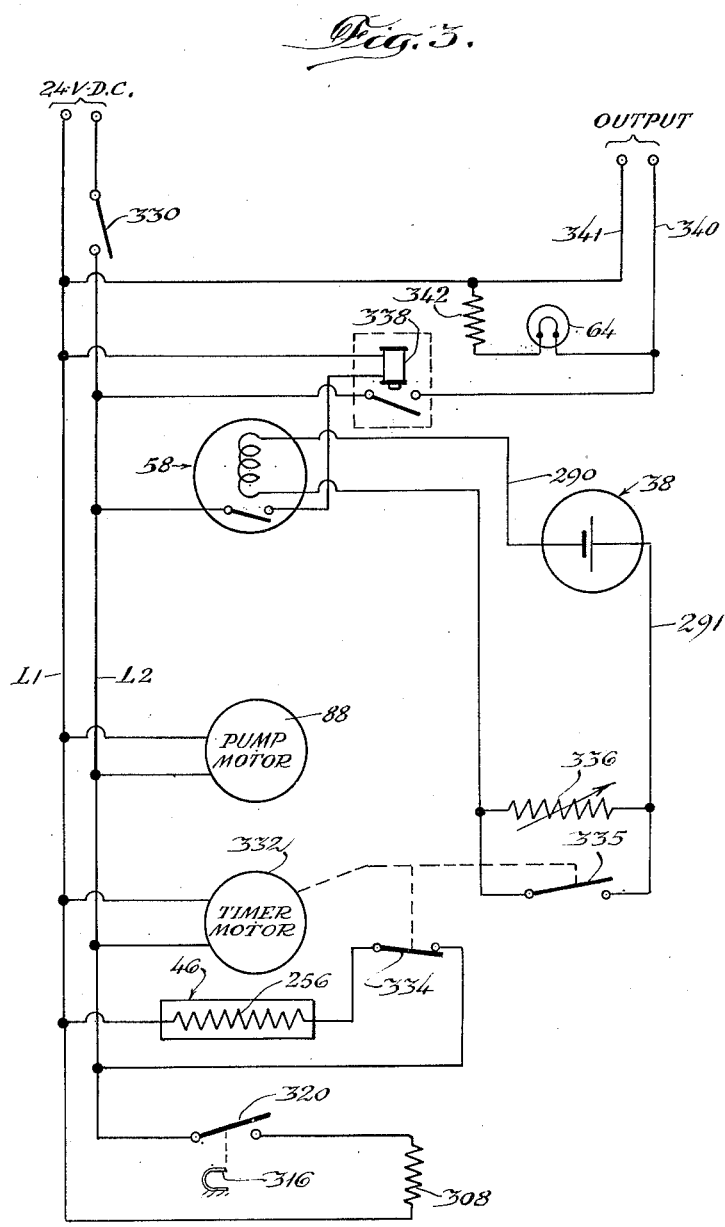

May 16, 1950 W. F. FAGEN 2,508,238
GASEOUS ACID ANHYDRIDE DETECTION APPARATUS
Filed March 21, 1945 6 Sheets-Sheet 4
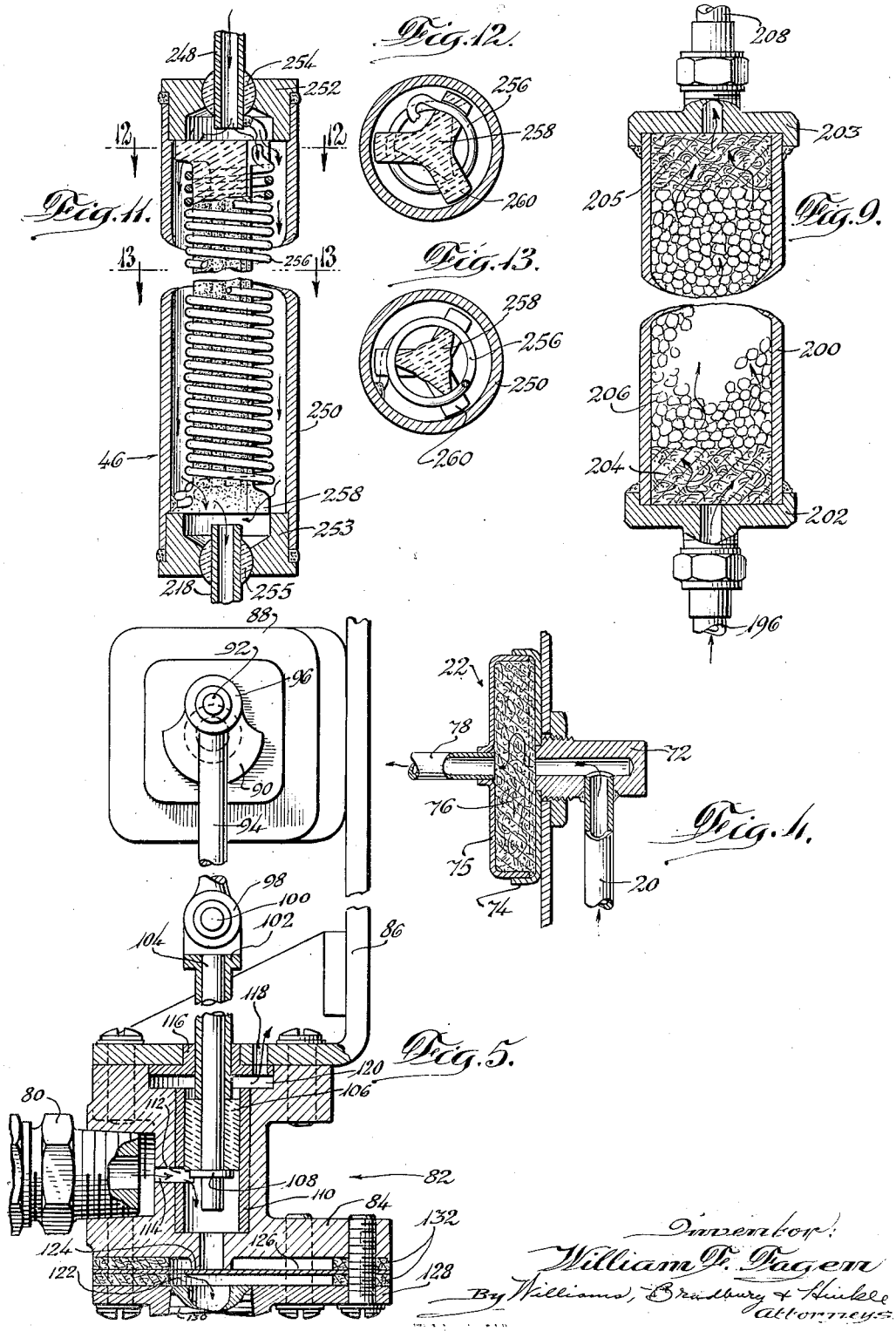
Inventor
William F. Fagen
By Williams, Bradbury & Hinkle
Attorneys May 16, 1950 W. F. FAGEN 2,508,238
GASEOUS ACID ANHYDRIDE DETECTION APPARATUS
Filed March 21, 1945 6 Sheets-Sheet 5
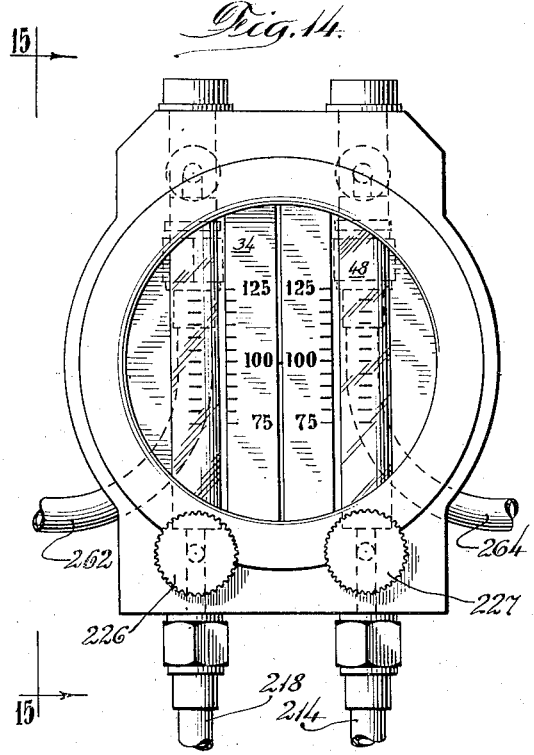
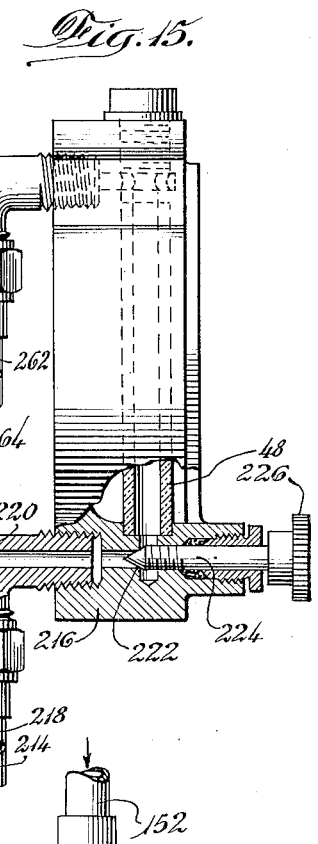
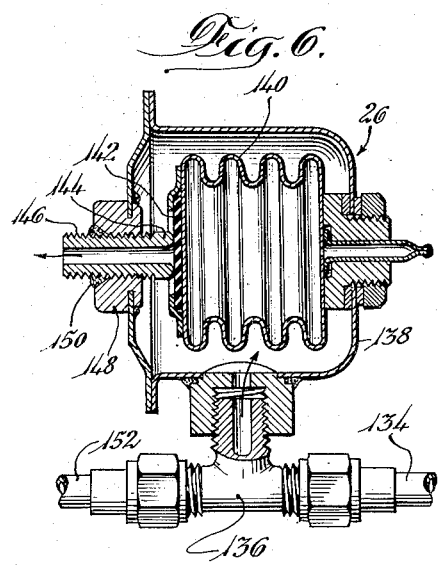
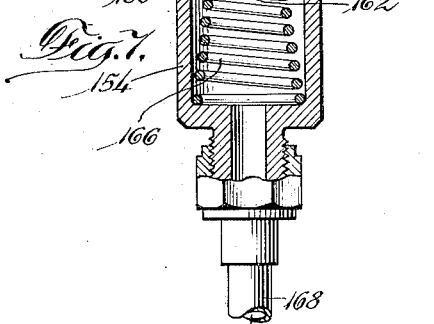
Inventor:
William F. Fagen
By Williams, Bradbury & Hinkle
Attorneys.

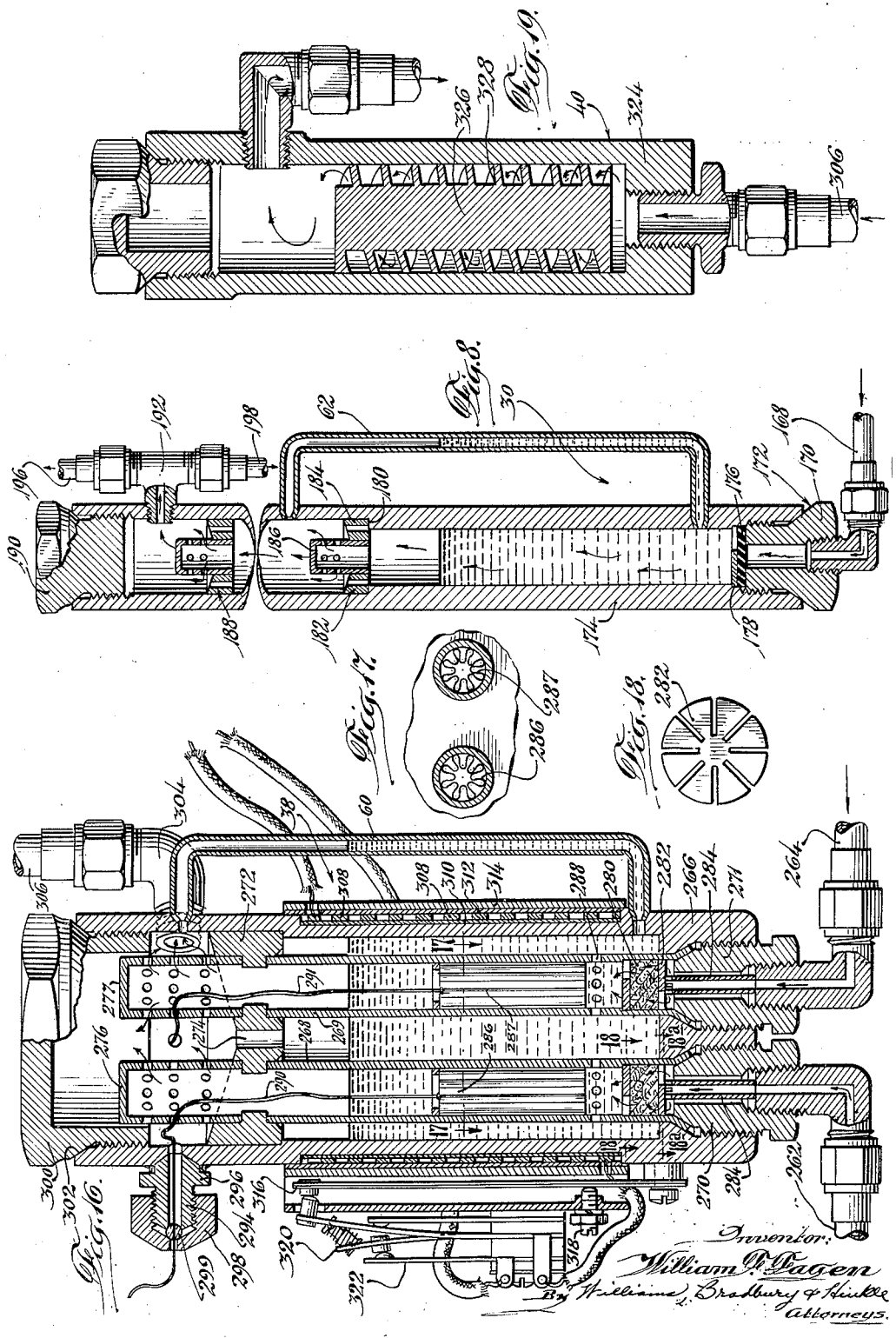

Patented May 16, 1950

2,508,238

UNITED STATES PATENT OFFICE 2,508,238

GASEOUS ACID ANHYDRIDE DETECTION APPARATUS

William F. Fagen, Indianapolis, Ind., assignor to Stewart-Warner Corporation, Chicago, Ill., a corporation of Virginia Application March 21, 1945, Serial No. 583,994

14 Claims. (Cl. 23—255)

The invention relates generally to an improved method and apparatus for the detection of gaseous acid anhydrides and percursors thereof, such for example, as carbon monoxide, carbon dioxide, sulphur dioxide, and the like.

It is frequently of great importance to be able to detect the presence of very small concentrations of carbon monoxide. For example, in aircraft there have been some instances of members of the crew being injuriously affected by carbon monoxide from the exhaust of the engines, and from other equipment. As is well known, carbon monoxide is odorless and its effects are therefore particularly vicious because the person affected does not have an opportunity to take any precautions or counter-measures. Likewise, heating systems of buildings occasionally are damaged or are operated improperly, and make it possible for some of the flue gases to mix with the air being heated.

In many instances, it is therefore of extremely great advantage to have available a method and apparatus for the detection of carbon monoxide and gaseous acid anhydrides, and to provide an indication or warning signal whenever the concentration of such noxious gases approaches toxic percentages. To be useful in accomplishing this purpose, the apparatus must be rugged, should operate either continuously or cyclically at short intervals, should be light in weight, portable, and self-regenerative.

The presence of acid anhydrides in air may be determined by passing the air through an aqueous solution and measuring the pH value of the solution.

In the conventional method for the determination of pH value, or hydrogen ion concentration, a glass electrode is used and the potential difference electronically amplified to provide a voltage suitable for indication. Due principally to the extreme fragility of the glass electrode, such apparatus is not suitable for general commercial use, particularly on aircraft and the like where the apparatus may be subjected to severe shock and vibration. Furthermore, the voltages generated by such glass electrode apparatus are in the microvolt range so that they cannot be used practically for indication or control purposes without amplification. In the apparatus of the present invention, it is not necessary to employ a glass electrode, or to utilize an electronic amplifier, since the voltages generated by the detection cell are in the order of several millivolts, which is sufficiently high for the direct operation of a sensitive electromagnetic relay.

It is thus the primary object of the invention to provide an improved apparatus and method for the detection of minute concentrations in the atmosphere of carbon monoxide, acid anhydrides, and gases capable of forming acid anhydrides.

A further object is to provide an improved apparatus of high sensitivity, which may be used to indicate or to provide an alarm when the atmosphere contains carbon monoxide or any similar gas.

A further object is to provide an improved system and apparatus for generating a substantial electric current when there exists an appreciable difference in hydrogen ion concentration in two partially segregated portions of an aqueous medium.

A further object is to provide an improved apparatus of the above mentioned type, in which there is employed means for compensating for variations in atmospheric pressure.

A further object is to provide an improved pumping means for forcing the atmosphere through the apparatus.

A further object is to provide an improved means for preventing loss of the aqueous solution through dispersion and vaporization in the air forced through the apparatus.

A further object is to provide an improved apparatus for the detection of the presence of carbon monoxide and the like in the atmosphere, in which means are provided for readily checking the operative condition of the apparatus.

A further object is to provide an improved control and indicating circuit arrangement for gaseous anhydride detection apparatus.

A further object is to provide an improved means for insuring accuracy of the indications in a gaseous anhydride detection apparatus, by maintaining the sensitive elements thereof at constant temperature.

A further object of the invention is to provide an improved apparatus of the above mentioned type, in which the voltage generated in the detection cell is sufficiently high for the direct operation of an electromagnetic relay.

A further object is to provide an improved apparatus of the above mentioned type, which does not require the use of an electronic amplifier.

A further object is to provide an improved apparatus of the above mentioned type, having visual means for indicating the flow of the gases through it.

A further object is to provide an improved apparatus for the detection of presence of gaseous acid anhydrides in the atmosphere, which is simple and compact in construction, is portable, is rugged, resistant to damage by vibration, is extremely sensitive, and which will have a long useful life.

Other objects will appear from the following description, reference being had to the accompanying drawings, in which:

Fig. 3 is a circuit diagram of the electrical portions of the apparatus;

Fig. 4 is a fragmentary sectional view of a filter forming part of the apparatus;

Fig. 5 is a fragmentary sectional view of the high speed pump used for forcing atmospheric air through the apparatus;

Fig. 6 is a sectional view of an improved absolute pressure responsive relief valve;

Fig. 7 is a sectional view of a loaded check valve forming part of the apparatus;

Fig. 8 is a longitudinal sectional view of means utilized to saturate the air circulated through the apparatus with water vapor;

Fig. 9 is a longitudinal sectional view of the soda lime filter for removing carbon dioxide and similar gases from the air;

Fig. 11 is a longitudinal sectional view of an improved burner forming the means for causing the carbon monoxide to combine with oxygen in the air to form carbon dioxide;

Figs. 12 and 13 are transverse sectional views taken on the lines 12—12 and 13—13, respectively, of Fig. 11;

Fig. 14 is a front elevational view of the flow meters;

Fig. 15 is a side elevational view, with the parts thereof in fragmentary section, taken on the line 15—15 of Fig 14;

Fig. 16 is a vertical sectional view of the detection cell;

Fig. 17 is a fragmentary sectional view taken on the line 17—17 of Fig. 16;

Fig. 18 is a plan view of the filter material retaining discs which are shown at lines 18—18 and 18a—18a of Fig. 16; and Fig. 19 is a vertical sectional view of the rectifier used to remove excess moisture from the gas as it leaves the detection cell.

General description

In order that the following detailed description of the invention may be more readily comprehended, it is preceded by this brief general description of the method and apparatus.

Figure 2:
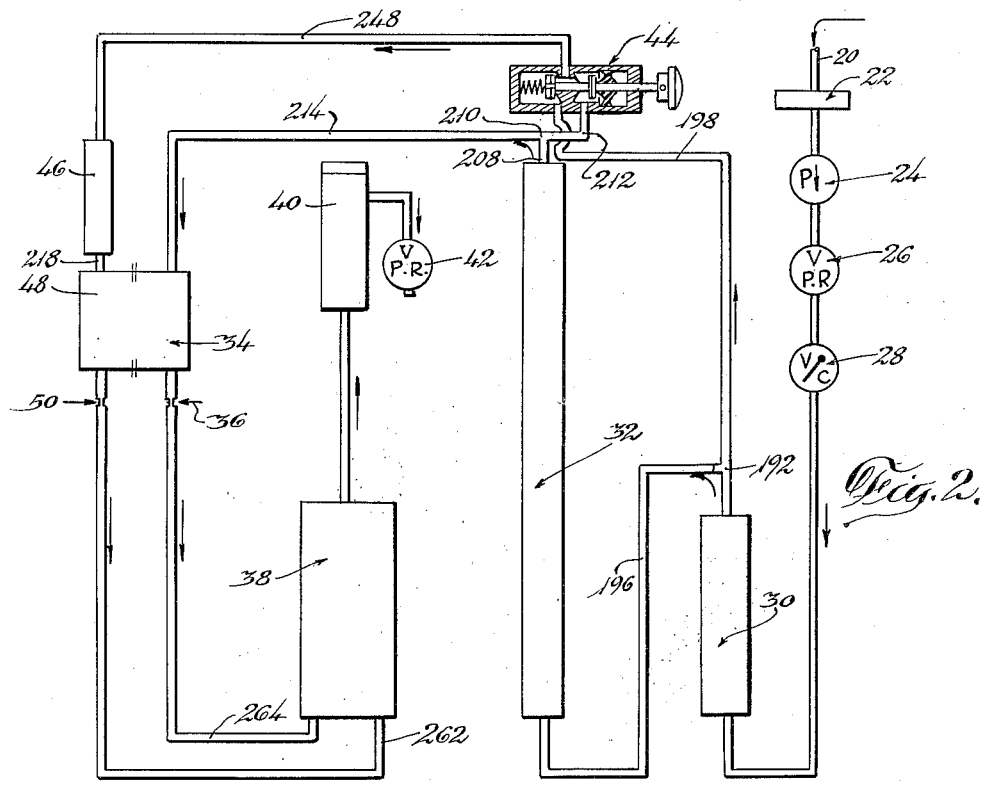
Fig. 2 is a flow diagram of the apparatus.

Referring particularly to the flow diagram of Fig. 2, atmospheric air is drawn into the apparatus through a pipe 20 through a dust filter 22 by means of a pump 24, the pump discharging past a pressure relief valve 26 and past a suitable check valve 28. The air passing the check valve 28 flows to a saturator 30 which contains distilled water and is provided to assure that the discharge therefrom will be of uniform humidity irrespective of the humidity of the atmosphere. The humidified air flows from the saturator 30 through a soda lime filter 32, which functions to remove $CO_2$, $SO_2$, and similar gases, but which does not remove CO. In normal use of the apparatus, one-half of the gases thus scrubbed by the soda lime filter flow through a suitable flow meter 34, past an adjustable restriction 36, into one compartment of a detecting cell 38. After passing through the cell 38, the gases pass through a rectifier 40 by which excess moisture is removed and returned to the cell 38, the discharge from the rectifier being under the control of an aneroid bellows regulated absolute pressure relief valve 42.

The other half of the air discharged from the saturator 30 flows freely through a two-way valve 44 to a burner 46, which in its preferred form comprises a platinum wire heated to incandescence so that any CO flowing with the air is oxidized or burned to form $CO_2$. The mixture of $CO_2$ and air from the burner 46 flows through a flow meter 48 past an adjustable restriction 50 to the other compartment of the cell 38, thereafter flowing with the other part of the air stream through the rectifier 40 to the pressure relief valve 42 from which it is discharged to the atmosphere. Due to the provision of the pressure relief valves 26 and 42, the pressure of the air and gases in the flow circuits between these two valves is maintained at a constant value irrespective of the changes in atmospheric pressure.

The cell 38 may be described generally as containing two interconnected compartments containing an aqueous solution of potassium chloride, one for the flow of that part of the air stream in which the CO has been burned to form $CO_2$, and the other part in which CO, in the concentration of the atmosphere, is present. Within each of the compartments of the cell 38 is an electrode, preferably of sheet platinum. When CO, that first has been burned to $CO_2$, flows through one of these compartments, and dissolves in the potassium chloride solution present therein, the electrical state or electrical activity of the resulting liquid will be different from that of the solution in the other compartment, through which unburned CO flows. An essential reason for this difference in electrical activity is that the $CO_2$ increases the hydrogen ion concentration of the solution in which it dissolves; whereas the hydrogen ion concentration of the other solution, in which the CO dissolves only to a slight extent, undergoes substantially no change. This difference in electrical activity between the two solutions is reflected in a difference of potential between the electrodes in the two compartments. This potential difference accumulates; that is, for a limited time the voltage between the cells builds up.

The apparatus is operated in a regenerative cycle. For an interval of approximately 30 seconds, the burner is energized and thus a potential is built up on the electrodes of the detection cell. During this 30 second interval, the sensitive relay is disconnected from the cell electrodes. During a following interval, such as 30 seconds, the burner is deenergized while the sensitive relay is connected to the cell electrodes. Thus the potential stored up on the electrodes of the cell operates the relay, provided there has been a sufficient concentration of CO in the atmosphere being analyzed. Also during the second interval the cell is "balanced" or normalized because the gases flowing through both compartments of the cell are of identical composition.

Operation of the sensitive relay may be utilized to complete a circuit through a more rugged relay and the latter may be utilized for the energization of any desired signal indicator, or may be used for the control of other apparatus.

Panel and chassis

Figure 1:
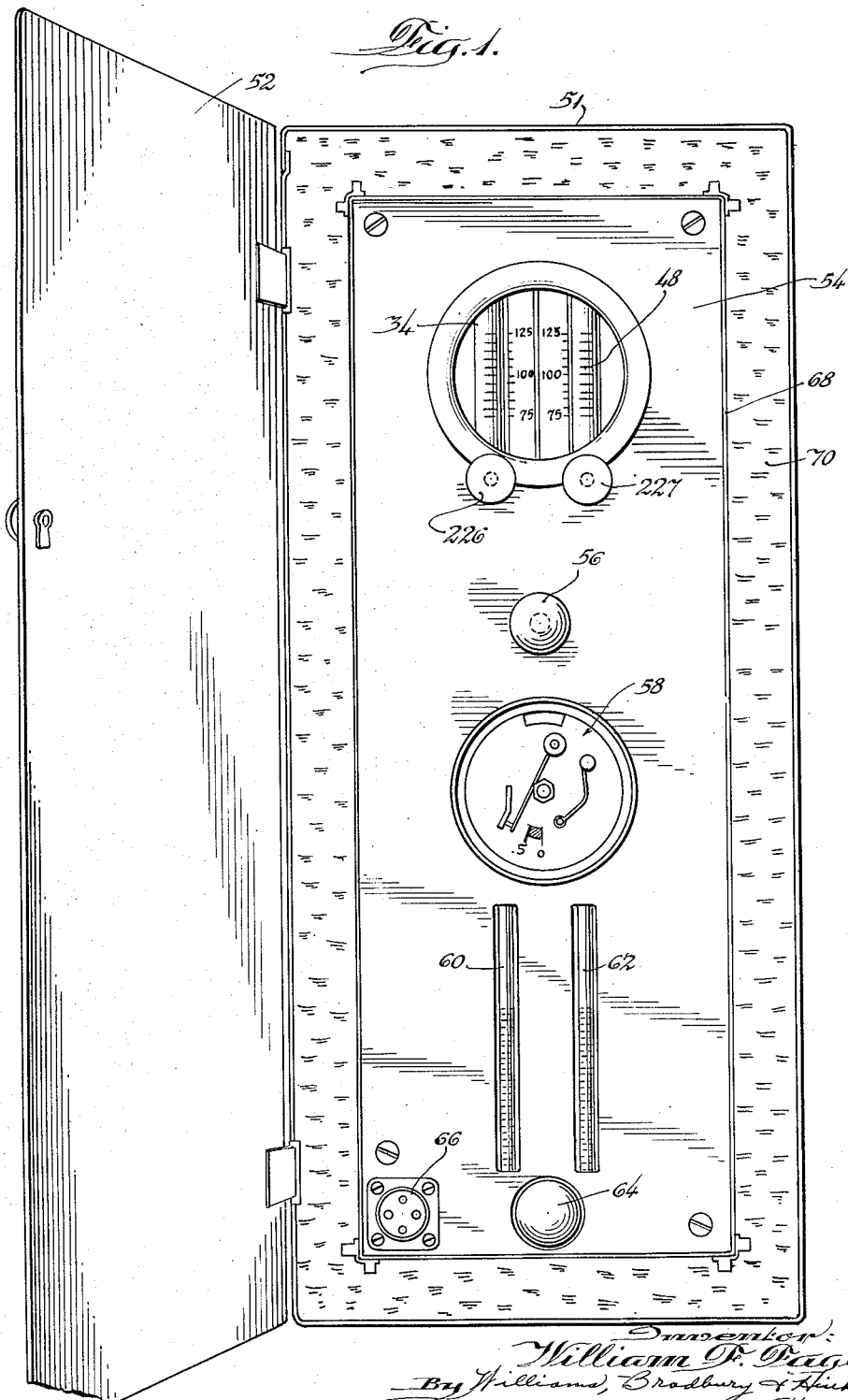
Fig. 1 is a front elevational view of the apparatus installed in a heat insulating case.

Referring to Fig. 1, the apparatus is illustrated as being mounted in a casing 51 preferably made of thin light weight sheet metal such as an aluminum alloy, having a door 52 hinged thereto. The apparatus comprises a front panel 54 apertured to receive the window of the flow meters 34 and 48. A valve control knob 56 projects from the front of the panel while a sensitive relay 58 has some of its operating parts visible through an opening formed in the panel. A pair of water level gauges 60 and 62 and an indicator lamp 64 are likewise visible through suitable openings formed in the panel 54. An electrical connection socket 66 is secured to the panel for making connection with a source of power and with other apparatus to be controlled. The apparatus is mounted on a suitable chassis of which the panel 54 forms a part, this chassis may be enclosed or partially enclosed by an internal housing 68, and the space between the housings 50 and 68 is filled with a suitable heat insulating liner 70 which may be of cork or other suitable material.

Air filter

Referring to Fig. 4, the glass wool filter 22 receives air from the atmosphere to be analyzed through the pipe 20 suitably connected to a fitting 72 which is welded or otherwise suitably secured to a pressed sheet metal casing half 74, the other half 75 of the casing being secured to the half 74 by welding or other suitable means. The casing 74, 75 is filled with compressed glass wool 76 for removing grit and dust from the air.

High speed air pump

The cleaned air is drawn from the filter through a tube 78 which is connected to the inlet fitting 80 of a high speed pump or compressor 82. This pump comprises a body 84 having a bracket 86 secured thereto. A high speed motor 88 is suitably secured to the bracket 86, this motor operating at a speed in the order of 6,000 R. P. M. The armature shaft of the motor 88 has a counterweight 90 secured to the end thereof, this counterweight having a crank pin 92 projecting therefrom. A connecting rod 94 has a ball bearing assembly 96 forming a rotary bearing connection with the crank pin 92 and has a similar ball bearing assembly 98 providing a pivot connection to a wrist pin 100 carried by a piston rod sleeve 102. A piston rod 104 is suitably secured in the sleeve 102.

A piston 106, which is preferably made of carbon, surrounds the piston rod 104 and is secured between a flange 108 formed on the latter and the lower end of the piston rod sleeve 102. The piston 106 is reciprocable in a cylinder liner 110 which is preferably made of stainless steel and is provided with an inlet port 112 in registry with an inlet port 114 formed in the body 84. The piston rod sleeve 102 is guided in a suitable bearing 116 which is secured in the bracket 86. Registering ports 118 are formed in the bearing 116 and bracket 86 to permit free communication between the atmosphere and a space 120 at the upper end of the cylinder.

An outlet port 122 is located in axial alignment with the cylinder 110 and is of sufficiently large diameter freely to receive the projecting end of the piston rod 104. A valve seat 124 is formed around the lower end of the outlet port 122 for engagement by a reed-type check valve 126 which is clamped to the body 84 by a plate 128. The plate 128 is suitably formed to receive a discharge or outlet fitting 130, suitable gaskets 132 being provided on either side of the check valve 126.

It will be noted that this pump operates at extremely high speed and therefore may be made very small and light in weight while pumping an appreciable quantity of air.

Absolute pressure relief valve and check valve

The outlet fitting 130 of the pump is connected by a tube 134 (Fig. 6) and a T 136 to the pressure relief valve 26. This valve comprises an airtight housing 138 within which there is located an evacuated bellows 140 having one end thereof clamped to the housing 138, and its other end conformed to receive a valve disc 142 which may be made of rubber or a suitable rubber substitute. This valve disc normally engages a valve seat 144 formed at the inner end of an outlet nipple 146 which is threaded in a bushing 148 and after being adjusted is preferably made airtight by a suitable sealing compound 150.

From the foregoing description of the absolute pressure relief valve 26, it will be apparent that this valve will operate to permit escape to the atmosphere of some of the air pumped by the pump 82 when the absolute pressure exceeds a value for which the valve is set. Thus air under constant absolute pressure is supplied through pipe 152, also connected to the T 136, to the check valve 28 (Fig. 7). The primary purpose of this check valve is to prevent return flow to the pump 82 when the latter is stopped. This check valve may be of any suitable construction, but is illustrated as comprising a housing 154 closed by a cap 156 upon which is formed an annular valve seat 158. The check valve comprises an annular disc 160 of rubber or similar material retained in a valve member 162, the valve member having a fluted stem 164 forming a loose guide. The valve is held against its seat by a light compression coil spring 166. A tube 168 is connected to the lower end of the check valve body 154.

Water vapor saturator

The tube 168 is connected to an inlet fitting 170 (Fig. 8) of the saturator 30, the fitting 170 having a frusto-conical surface 172 forming a tight seal with the lower end of a tubular body 174, preferably made of Saran, a vinylidene chloride thermoplastic. The inlet fitting 170 also clamps a porous rubber disperser 176 against a slotted washer 178, the latter abutting against a suitable shoulder formed within the body 174. The slotted washer 178 may be generally of a form shown in Fig. 18. Resting against a shoulder 180 near the upper end of the tubular body 174 of the saturator is a separator or moisture collector 182, comprising an annular perforated plug 184 in which an inverted perforated cup 186 is fitted. Spaced a considerable distance above the collector 182 is a similar collector 188. These collectors, acting as perforated baffles, are operative to remove droplets of water which might otherwise be carried from the saturator. The upper end of the tubular body 174 is closed by a plug 190 while a T 192 has one leg threaded into the body 174 in communication with the space directly beneath the plug 190. A water level gauge tube 62 has its ends secured to the body 174 in hermetically sealed relationship. By making the body 174 and the gauge tube 194 of Saran, the ends of the gauge tube 194 may be joined to the body 174 by applying heat and pressure. The saturator is partially filled with distilled water which may be replenished from time to time by unscrewing the plug 190. The purpose of the saturator is to secure substantially 100% humidification of the air forced through it, so that the initial humidity of the air being analyzed will not have any effect, and further, to prevent excessive loss of water from the detecting cell, which would occur if the air dispersed through it were not thoroughly humidified.

Soda lime filter

A tube 196 connects one branch of the T 192 to the soda lime filter 32 (Fig. 8), while the other branch of the T 192 is connected to the two-way valve 44 by tubing 198. The soda lime filter is shown in Fig. 9 as comprising a tube 200 of Saran or similar material, which is suitably bonded to end caps 202 and 203. Within the tube 200, adjacent both the bottom and top thereof, are wads 204, 205 of glass wool or similar material which is utilized to retain granules 206 of soda lime ($CaO+NaOH$).

*Flow meters and adjustable flow restrictions*

The outlet at the upper end of the cap 203 is connected by a tube 208 with a T 210 (Fig. 2), one branch of this T being connected by a tube 212 with the two-way valve 44, while the other branch thereof is connected by a tube 214 with the flow meter 34. As shown in Figs. 14 and 15, the flow meters 34 and 48 form part of a unit comprising a body 216 to which the tube 214 and a tube 218 are connected by elbows 220. Suitably secured in the body 216 are the similar transparent indicator tubes 34 and 48 which may be glass but which are preferably made of Saran and thus may readily be sealed to the body 216 by application of heat and pressure. The flow of air upwardly through the tube 34 results in forcing an indicator element (not shown) upwardly, and since the bore through the tube tapers outwardly in an upward direction, the clearance between the indicator element and the walls of the bore increases as the indicator element is raised. The heights of the indicator elements thus show the flow rates, which may be read on the adjacent suitably calibrated graduations. Such flow meters are of well known construction and therefore have not been illustrated in great detail.

At the inlet of each of the flow meters, there is a seat 222 for a needle valve 224 which may be adjusted by means of a knurled knob 226. These knobs project in front of the panel 54 (Fig. 1) and are adjusted to provide the restrictions indicated diagrammatically in Fig. 2, as the restrictions 36 and 50, to cause the flow rates through the two meters to be substantially equal.

*Two-way valve*

Figure 10:
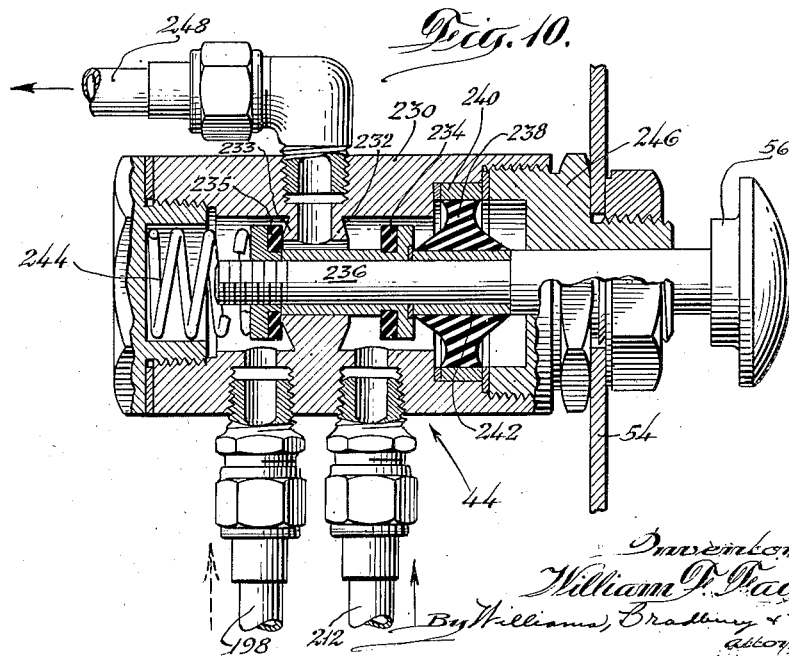
Fig. 10 is a longitudinal sectional view of an improved two-way valve.

The two-way valve shown in Fig. 10, which is not necessarily a part of the apparatus, comprises a valve body 230 having internal valve seats 232 and 233 for engagement by annular valve discs 234 and 235 suitably secured to a valve plunger 236. The valve plunger 236 is sealed to the body 230 by a flexible elastic diaphragm 238 made of rubber or the like, and has its outer edge bonded to a ring 240 and its central portion bonded to a sleeve 242, the latter pressed over the plunger 236. The plunger is urged to the right by a compression coil spring 244 normally to maintain the valve 235 closed against its seat 233. The plunger 236 is provided with the control knob 56, the plunger being guided in a bushing 246 by which the valve is secured to the panel 54, and by which the ring 240 is clamped between sealing gaskets.

A tube 198 connects the T 192 (Fig. 8) with the valve body 230 so as to have its flow controlled by the valve 235. It will be noted from Fig. 10 that the two-way valve is normally in such position that air may flow freely from the tube 212 through the valve body, and flow therefrom through a tube 248.

*The burner*

The tube 248 has its other end connected to the burner 46, which comprises a metal tube 250 (Figs. 11–13) having apertured end plugs 252 and 253. The plugs 252 and 253 are conformed to engage bead-like seals 254 and 255, respectively, formed on the tubes 248 and 218. The tube 248 is thus insulated from the plug 252 and is utilized as a conductor for supplying current to a coil 256 of platinum wire wound on a suitable form 258 of soapstone or similar insulating and heat resisting material.

As best shown in Figs. 12 and 13, this form 258 is of generally triangular shape in transverse section and has three arms 260 at each end for locating the form centrally within the tube 250. One end of the coil of platinum wire 256 is brazed to the end of the tube 248, while the other end is suitably brazed to the tube 250. Thus electrical connections may be made with the tubes 248 and 250 to supply energizing current to the wire 256. There is substantially three point contact between each turn of the coil 256 and the form, so that the major portion of the surface of the wire is exposed to the air flowing through the burner.

When the burner is energized, the wire 256 is raised to the temperature of incandescence and thus any CO in the air will be combined with the oxygen to form $CO_2$.

The part of the air which has thus had its CO content converted to $CO_2$, after passing through the flow meter 48, flows to one compartment of the detection cell 38 through a tube 262. In a similar manner the other part of the gas sample, after flowing through the flow meter 34, passes through a tube 264 leading to the other compartment of the detection cell.

*Detection cell*

As shown in Fig. 16, the detection cell comprises a tubular body 266 preferably made of Saran. A pair of chimneys 268, 269, likewise made of a suitable insulating material such as Saran, have their lower ends flared and secured to the body by inlet bushings 270 and 271, respectively, to which the tubes 262 and 264 are connected. The upper ends of the chimneys 268, 269 fit in suitable recesses formed in a locating plug 272 which has a central drain opening 274 and the upper surface of which is dished to conduct water to the drain opening. Also secured to the locating plug 272 are a pair of perforated caps 276, 277, which aid in separating any water mist or droplets which may be carried with the air. At the lower end of each of the chimneys 268, 269, there is a compressed glass wool microdisperser 280, each of which is retained between a pair of slotted washers 282 (Fig. 18), the upper washer of each pair being pressed against a shoulder formed within the chimney, while the lower washer of each pair is held in position by a tube 284, the upper end of which is slotted to permit free flow of the air.

It has been found that substantially any desired degree of microdispersion of air in the liquid may be obtained by varying fineness or the degree of compression of the glass wool. This microdisperser has a reasonable amount of resistance to damage by freezing and shock, and has been found to be stable with respect to continued use when various salt solutions are used.

Suitably secured, as by a press fit within the chimneys 268, 269, are two electrodes 286, 287, preferably made of platinum foil. As best shown in Fig. 17, these electrodes have a plurality of deep vertical corrugations so as to provide large surface areas in contact with the liquid within the cell. The interior of each of the chimneys 268, 269 is in free communication with the interior of the body 266 through a plurality of perforations 288 located directly beneath the electrodes 286, 287.

The cell is partly filled with an aqueous solution, preferably a 1 N solution of KCl, that is, a solution of about 75 g. of KCl per liter of distilled water. The extent to which the body is filled with the solution may be observed through the panel by the height of the liquid in the tube 69, the latter being preferably made of Saran and having its ends homogeneously joined to the body 266 by the application of heat and pressure.

Conductors 290 and 291 are respectively connected to platinum foil electrodes 286 and 287, as by welding, and lead from the body 266 through sealing fittings 294. Each of these fittings comprises a nipple 296 sealed to the body 266 and having a cap 298 threaded thereto. The conductors 290 and 291 each has a glass bead 299 fused thereon and this glass bead is clamped between the fitting 296 and cap 298 so as to form an airtight insulating seal for the conductor 290.

The top of the tubular body 266 is closed by a plug 300 which has a frusto-conical surface 302 for making an airtight seal. An elbow 304 is threaded into the body 266 above the locating plug 272 and forms an outlet which is connected by a tube 306 to the rectifier 40.

To insure uniformity of operation of the cell 38, it is preferably maintained at a constant temperature. It has been found that the sensitivity is greatest through the range from 110° F. to 140° F. To maintain the temperature of the solution in the cell at a value within this range, e. g., 120° F., there is provided a thermostatically controlled heater comprising a rectangular high resistance wire 308 coiled about the lower portion of the body 266 and insulated therefrom by a mica sheet 310. A similiar mica sheet 312 surrounds the coil 308 to insulate it from a surrounding shield 314.

Suitably secured to the shield 314 is a thermostatic switch comprising a bimetal 316 having one end rigidly secured to the body 266 and having its initial flexure adjustable by means of an adjusting screw 318. The bimetal 316 operates a switch arm 320 which is adapted to make contact with a switch arm 322 and thus complete the circuit to the heating element resistance wire 308. The thermostatically operated switch may be of any conventional snap acting construction.

*Rectifier*

As shown in Fig. 19, the rectifier 40 comprises a tubular body 324. Within the cylindrical bore of the body 324 there is a plug 326 which has a helical fin 328 having a press fit with the bore, thereby to form a helical passageway for the flow of air. Due in part to the centrifugal action, air flowing through this helical passageway has any droplets carried therewith thrown against the wall of the bore so that the air leaving the upper end of this passageway is substantially free from condensed moisture. Any water separated from the air flows downwardly along the helical passageway and may drain back into the upper end of the detection cell through the tube 306.

The heat generated by the heating coil 308 of the detection cell 38 is communicated in part to all of the other elements of the apparatus, and has been found sufficient to prevent freezing of water contained in such other elements. However, the temperature of the solution in the detection cell will normally be higher than that of the rectifier 40 and the condensation of moisture within the latter will therefore be increased. Thus net evaporation of the water in the cell will be at an insignificant rate.

*Electrical components and circuits therefor*

Referring to Fig. 3, the various electrical components of the apparatus are shown diagrammatically together with the circuits connecting them. In this diagram the apparatus is assumed to have been designed for operation on an airplane customarily having a 24 v. direct current power supply.

The apparatus may be energized by closing a manually operated main switch 330, thereby energizing line conductors L1 and L2. Assuming that the cell 38 is at a temperature below 120° F., the thermostatically operated switch 320 will be closed and the heating element 310 immediately energized. Likewise, the pump motor 88 will be immediately energized to start pumping air through the apparatus. A constant speed motor 332 is likewise immediately energized, this motor driving a suitable speed reducing gear train for the operation of a pair of switches 334 and 335.

The driving connection between the motor gear train and the switches 334 and 335 is such that when the switch 334 is opened the switch 335 is closed, and vice versa. The timing is preferably such that a complete cycle of opening and closing of these switches takes place in one minute, each switch being open for one-half minute and closed for one-half minute.

The switch 334, when closed, supplies current to the platinum burner 256, while the switch 335 when closed connects the cell output lead 291 to the sensitive relay 58, the other lead 290 of the cell being permanently connected to the other terminal of the sensitive relay 58, which may be of the Weston "Sensitrol" type. Connected in parallel with the switch 335 is a resistance 336, adjustable to a relatively high value, for example, adjustable from zero to 5 megohms, and used in the calibration of the apparatus, to cause the sensitive relay 58 to operate only when the concentration of CO in the atmosphere being analyzed exceeds a predetermined value.

Energization of the sensitive relay 58 operates to complete a circuit to a more rugged relay 338 by connecting it across the line conductors L1, L2. Energization of the relay 338, completes a circuit between L2 and output conductor 340, the other output conductor 341 being connected to L1. The indicator lamp 64, in series with a voltage dropping resistor 342, is connected across the output conductors 340, 341.

*Operation*

In using the apparatus, the intake tube 20 is connected to the space from which the air is to be drawn for the purpose of analysis, and the main switch 330 is closed. As previously mentioned, the closure of this switch will result in starting of the pump motor 88, energization of the cell heating element 308 (if the cell is at a temperature lower than 120° F.), and energization of the timing motor 332.

Assuming that the main switch is closed at the beginning of a cycle, the switch 334 will be closed and the switch 335 open, and these switches will remain in their respective conditions for a predetermined period, such as 30 seconds. The pump or air compressor 24 will supply air under pressure to cause its circulation through the various paths previously described with reference to Fig. 2. Since the pump operates at high speed, in the order of 6000 R. P. M., and since it has a substantial displacement (e. g., 0.25" bore and 0.25" stroke), the air in the system will rapidly be raised to a pressure at which the pressure relief valve 42 opens to permit escape of air from the system.

Assuming that the saturator 30 contains an ample supply of distilled water, and that the cell 38 is amply supplied with the KCl solution, as may be readily determined from observation of the liquid level gauges 62 and 60, the apparatus commences operating.

It will be understood that during normal operation the spring 244 holds the two-way valve in the position in which it is shown in Fig. 10, so that the air leaving the soda lime filter 32 will divide at the T 210 and will flow at substantially equal rates through the two flow meters 34 and 48. The rates of flow may, of course, be readily adjusted by means of the needle valves 224, observing the indications in the flow meters to secure this regulation. Since both the pressure relief valves 26 and 42 operate to permit escape of air from the system at predetermined absolute pressures, the air between these two valves will, during operation, be maintained at a constant pressure irrespective of the pressure from which the air is drawn or the atmosphere into which it is discharged. Thus the apparatus may be used with equal effectiveness and accuracy at sea level or any other elevation at which the airplane may be flying. Having initially adjusted the needle valves 224 to secure equal flow rates through the two parallel flow paths, they will not require frequent readjustment.

The air being substantially completely saturated with water vapor in passing through the saturator 30, it will have $CO_2$, $SO_2$, and similar gases removed as it passes through the soda lime filter 32. However, this filter will not remove CO from the gas mixture. During the assumed first half of the cycle of operation, the burner is energized and hence any CO in that portion of the sample which passes through the burner 46 will combine with the oxygen of the air to form $CO_2$, due to the heating and possibly catalytic effect of the incandescent platinum in the burner. It will be readily apparent that the concentration of $CO_2$ will be proportional to the concentration of CO in the air being analyzed.

The sample of air containing the $CO_2$ enters the chimney 268 and the $CO_2$ is dissolved in the KCl solution therein, thereby increasing its hydrogen ion concentration, as stated above. The other portion of the sample which is supplied to the chimney 269, contains the CO which is not appreciably soluble in the KCl solution, and which does not appreciably change its hydrogen ion concentration. The solutions in the two chimneys come into mutual contact by virtue of the perforations 288 therein so that a difference in potential will appear across the platinum electrodes 286 and 287 as a result of the mutual contact of said solutions at different hydrogen ion concentrations.

Upon completion of the first half of the cycle, the timing motor 332 will operate to close switch 335 and open switch 334, thus completing the circuit between the electrodes of the cell and the winding of the sensitive relay 58, and deenergizing the burner 46. Assuming that there was a small percentage of CO in the air sample being analyzed, there will have been sufficient potential difference between the two electrodes 286 and 287 to cause operation of the sensitive relay 58 and the latter will therefore in turn operate the relay 338. The circuit completed by the relay 332 will be through the indicator lamp 64 with its series resistor 342 and through any other control or indicating apparatus which may be connected to the terminals of the wires 340, 341.

During the second half of the cycle, the air samples supplied to the two chimneys 268, 269, will be identical, and after a short time the hydrogen ion concentration of the portions of the solution within the chimneys 268, 269 will become the same and the cell thus put in normal condition.

As the air leaves the chimneys 268, 269, the water spray is separated therefrom by the perforated caps 276, 277 as well as by the separator or rectifier 40, so that the supply of the solution in the cell 38 will not be depleted.

Theory of operation

The pump 24 has sufficient capacity that even at high altitudes it will maintain the required pressure within the system. Under most conditions of operation, surplus air supplied by the pump will continuously escape from the pressure relief valve 26. The check valve 28 is provided merely as a safety measure to prevent reverse flow of liquid from the saturator 30 in the event that the pump 24 should be stopped either accidentally or when the system is shut off.

In order to calibrate the apparatus, it is desirable to connect the inlet 20 to a source of air containing a known percentage of $CO_2$. In most locations, the $CO_2$ in the atmosphere will have a concentration sufficiently invariable that the atmosphere may be used as a calibrating sample. When making the calibration, the valve 44 is manually operated to connect the pipe 198 to the pipe 248 which leads to the burner 46. The other part of the sample passes through the soda lime filter 32 where the $CO_2$ is removed. Thus the chimney tube 268 is supplied with air containing $CO_2$, while the air supplied to the chimney tube 269 does not contain $CO_2$. For these test purposes, a meter may be connected across the cell 38 and the meter thus calibrated. In addition, the variable resistor 336 may be adjusted so as to cause operation of the sensitive relay 58 when the concentration of CO reaches a predetermined value.

The apparatus shown is extremely sensitive and may be adjusted to cause the operation of the sensitive relay 58 when the concentration of CO in the atmosphere being analyzed is in the order of ten parts in a million.

The apparatus and its method of operation are such that its sensitivity increases with decreasing concentration of CO. This may be explained by the fact that the potential developed across the electrodes 286, 287 is determined by the logarithm of the ratio of the activity of the solution in one of the chimneys 268 relative to the activity of the solution in the other chimney 269.

The electrochemical formula may, for the sake of simplicity, be reduced to the following equation:

$$E = K \log \frac{a'}{a^0}$$

in which E is the potential difference generated across the electrodes; K is a constant; $a'$ is the activity of the solution in the chimney 268, and $a^0$ is the activity of the solution in the chimney 269. Since the temperature and pressure within the two chimneys are equal, these factors, as well as others, need not be considered, or may be assumed to be included within the constant K. From this formula it will be apparent that as $a'$ decreases in value by a factor of 10 for example from 0.010 (logarithm—2.00) to 0.001 (logarithm—3.00), the electrical potential differences across the electrodes will change by the factor 2/3; whereas, when $a'$ decreases from 0.001 (logarithm—3) to 0.0001 (logarithm—4) the potential across the electrodes will change by a factor of 3/4. Because of this relationship it appears that under properly controlled conditions the apparatus of this invention may be employed to detect concentrations of CO in air of as low as one to ten parts in a billion. This is possible because the potentials developed are not proportional to the concentrations, but are proportional to the logarithm of the concentration, and therefore a relatively slight change in concentration causes a greatly magnified (mathematically and actually) change in the potential developed.

For ordinary uses, it is not essential that the apparatus give a warning signal on very low concentrations of CO. For example, when used on aircraft, the apparatus will usually be adjusted so that the sensitive relay will be operated when the concentration of CO in the air being analyzed is in the order of 0.005.

While the principle of operation of the cell is not thoroughly understood in all its details, it appears that the "air electrode" phenomenon is employed. Apparatus of the type disclosed herein has been operated over long periods of time, frequently analyzing an atmosphere containing various fumes such as are present in painting and lacquering and plating departments of a factory, without "poisoning" the cell and without interfering with the satisfactory operation of the apparatus. It therefore appears that the apparatus may be used under wide variety of conditions without impairment of function.

The apparatus disclosed herein was particularly designed for use on aircraft where it would be subject to wide variations in temperature and pressure and subject to considerable shock and vibration. For use in analyses of the atmosphere on the ground, the apparatus could be simplified in many respects. For example, in using the apparatus in a laboratory it might not be necessary to provide the means for heating the cell and possibly the rectifier and saturator would not be essential. For some purposes it might be preferable to have the potential across the electrodes indicated or recorded continuously by a meter, in which event the burner would be energized continuously. In some installations it might be desirable to connect a voltage amplifier between the cell and the meter. However, under most conceivable conditions of use of the apparatus, the cycling herein described would be preferable since it makes the use of an amplifier unnecessary, and since the cycling system insures a more significant potential difference on the electrodes by permitting the potential to "accumulate" for a short time.

It has been found that solutions of materials other than KCl may be employed, and that metals other than platinum may be used for the electrodes. However, the use of platinum electrodes in a dilute KCl solution has been found to cause the cell to generate the highest potentials.

While I have shown and described a particular embodiment of my invention, it will be apparent to those skilled in the art, that numerous modifications and variations may be made therein without departing from the underlying principles of the invention. I therefore desire, by the following claims, to include within the scope of my invention all such modifications and variations by which substantially the results thereof may be obtained by the use of the same or substantially the same means.

I claim:

1. Apparatus for analyzing air for the presence of an acid anhydride forming gas comprising, in combination, a pump having its inlet connected to the source of air to be analyzed, a first pressure responsive air relief valve connected by a conduit to the outlet of the pump, a conduit connecting the outlet of said first relief valve, through a check valve and a humidifier, to the inlet of an absorbent container for removing acid anhydrides from the air supplied by said pump, a bifurcated conduit connected with the outlet of said container for dividing the air flowing therefrom into two separate streams of substantially equal flow rates, one fork of said bifurcated conduit being connected with the inlet of a combustion chamber and the other fork being connected with the inlet of a first flow meter, a burner positioned in said combustion chamber for causing acid anhydride forming gas in one of the air streams to combine with oxygen therein to form an acid anhydride, a conduit from the outlet of the combustion chamber to the inlet of a second flow meter, separate conduits from the respective outlets of the two flow meters to the respective inlets of two absorption chambers mounted, in spaced apart relationship, in a cell that is adapted to be partly filled with a salt solution, a metallic electrode positioned in each of said absorption chambers, apertures in the walls of said absorption chambers adjacent to said electrodes to provide free communication of said salt solution between said cell and said absorption chambers, said electrodes being connected in an electrical circuit that includes said salt solution, means for indicating the potential difference between said electrodes and a timer operating cyclically and alternately to energize said burner and disconnect said indicating means from the electrodes during part of a cycle, and to deenergize said burner and connect said indicating means to said electrodes during the remainder of the cycle, a reflux closure for each of said absorption chambers located above the level of the salt solution therein, a discharge chamber in said cell located above the level of the salt solution therein, apertures in said reflux closures to provide for the flow of air from said absorption chambers into said discharge chamber, and a conduit connecting said discharge chamber, through an entrainer and a second pressure responsive relief valve, to the atmosphere.

2. The combination set forth in claim 1, in which the electrodes are sheets of platinum having a relatively large surface area.

3. The combination set forth in claim 1, in which the burner comprises a tubular member containing a platinum wire, and a source of electrical energy connected to the ends of the wire to heat the latter to incandescence.

4. The combination set forth in claim 1, in which the means for indicating the electrical potential difference of the electrodes comprises a sensitive relay, and electrical indicating means controlled by the relay.

5. The combination set forth in claim 1, in which said cell is provided with thermostatically controlled heating means operable to maintain it at a predetermined temperature.

6. Apparatus for analyzing air for the presence of an acid anhydride forming gas comprising, in combination, a pump having its inlet connected to the source of air to be analyzed, a first pressure responsive air relief valve connected by a conduit to the outlet of the pump, a conduit connecting the outlet of said first relief valve, through a check valve and a humidifier, to the inlet of an absorbent container for removing acid anhydrides from the air supplied by said pump, a bifurcated conduit connected with the outlet of said container for dividing the air flowing therefrom into two separate streams of substantially equal flow rates, one fork of said bifurcated conduit being connected with the inlet of a combustion chamber and the other fork being connected with the inlet of a first flow meter, a burner positioned in said combustion chamber for causing carbon monoxide in one of the air streams to combine with oxygen therein to form carbon dioxide, a conduit from the outlet of the combustion chamber to the inlet of a second flow meter, separate conduits from the respective outlets of the two flow meters to the respective inlets of two absorption chambers mounted, in spaced apart relationship, in a cell that is adapted to be partly filled with a salt solution, a metallic electrode positioned in each of said absorption chambers, apertures in the walls of said absorption chambers adjacent to said electrodes to provide free communication of said salt solution between said cell and said absorption chambers, said electrodes being connected in an electrical circuit that includes said salt solution, means for indicating the potential difference between said electrodes and a timer operating cyclically and alternately to energize said burner and disconnect said indicating means from the electrodes during substantially one-half of a cycle, and to deenergize said burner and connect said indicating means to said electrodes during the remainder of the cycle, a reflux closure for each of said absorption chambers located above the level of the salt solution therein, a discharge chamber in said cell located above the level of the salt solution therein, apertures in said reflux closures to provide for the flow of air from said absorption chambers into said discharge chamber, and a conduit connecting said discharge chamber, through an entrainer and a second pressure responsive relief valve, to the atmosphere.

7. In an apparatus for analyzing air for the presence of carbon monoxide, the combination of compression means for supplying under pressure air to be analyzed, a conduit from the outlet of said compression means to the inlet of an absorber adapted for removing acid anhydrides from the air to be analyzed, a divided conduit for dividing the air flowing from said absorber into two separate streams, one division of said conduit connecting said absorber to the inlet of a combustion chamber with an igniter located therein for causing carbon monoxide in the air stream entering the combustion chamber to combine with oxygen therein to form carbon dioxide, a cell adapted to be partly filled with salt solution, two absorption chambers mounted in said cell, the second division of said divided conduit connecting said absorber to the inlet of one of said absorption chambers, a conduit connecting the outlet of the combustion chamber to the inlet of the second absorption chamber, an air disperser in each of said absorption chambers near the inlet thereof, an electrode mounted in each of said absorption chambers, apertures in the walls of said absorption chambers adjacent to said electrodes to provide free communication of said salt solution between said cell and said absorption chambers, and an electrical circuit including said electrodes, said salt solution and electrical potential indicating means.

8. The combination set forth in claim 7 in which said cell is provided with thermostatically controlled heating means operable to maintain it at a predetermined temperature.

9. In an apparatus for analyzing air for the presence of an acid anhydride forming gas, the combination of compression means for supplying under pressure the air to be analyzed, a conduit from the outlet of said compression means to the inlet of an absorber adapted for removing acid anhydrides from the air to be analyzed, a bifurcated conduit connected with the outlet of said absorber for dividing the air flowing therefrom into two separate streams of substantially equal flow rates, a first fork of said bifurcated conduit connecting said absorber to the inlet of a combustion chamber with an igniter located therein for causing acid anhydride forming gas in one of said streams of air to combine with oxygen therein to form its acid anhydride, a cell adapted to contain an aqueous medium, two communicating absorption chambers mounted in said cell, the second fork of said bifurcated conduit connecting said absorber to the inlet of one of said absorption chambers, a conduit connecting the combustion chamber to the inlet of the second absorption chamber, an electrode mounted in each of said absorption chambers, apertures in the walls of said absorption chambers adjacent to said electrodes to provide free communication of said aqueous medium between said cell and said absorption chambers, and an electrical circuit including said electrodes, said aqueous medium and electrical potential indicating means.

10. In an apparatus for analyzing air for the presence of an acid anhydride forming gas, the combination of compression means for supplying under pressure the air to be analyzed, a conduit from the outlet of said compression means to the inlet of an absorber adapted for removing acid anhydrides from the air to be analyzed, a bifurcated conduit connected with the outlet of said absorber for dividing the air flowing therefrom into two separate streams of substantially equal flow rates, a first fork of said bifurcated conduit connecting said absorber to the inlet of a combustion chamber with an igniter located therein for causing acid anhydride forming gas in one of said streams of air to combine with oxygen therein to form its acid anhydride, a cell adapted to contain an aqueous medium, two communicating absorption chambers mounted in said cell, the second fork of said bifurcated conduit connecting said absorber to the inlet of one of said absorption chambers, a conduit connecting the combustion chamber to the inlet of the second absorption chamber, an electrode mounted in each of said absorption chambers, apertures in the walls of said absorption chambers adjacent to said electrodes to provide free communication of said aqueous medium between said cell and said absorption chambers, and an electrical circuit including said electrodes, said aqueous medium and electrical potential indicating means, and thermostatically controlled heating means outside and adjacent to said cell, operable to maintain it at a predetermined temperature.

11. In an apparatus for detection of the presence of carbon monoxide in the atmosphere, the combination of an absorber for removing acid anhydride gases from the air being analyzed, a bifurcated conduit connected with the outlet of said absorber for dividing the air flowing therefrom into two separate streams of substantially equal flow rates, a first fork of said bifurcated conduit connecting said absorber to the inlet of a combustion chamber, a burner located in said combustion chamber for causing any carbon monoxide, contained in the one of said streams of air that enters said combustion chamber, to form carbon dioxide, a cell having a main body adapted to contain an aqueous solution, two absorption chambers mounted in said cell, the second fork of said bifurcated conduit connecting with the inlet of one of said absorption chambers, a conduit connecting the combustion chamber to the inlet of the second absorption chamber, an air disperser in each of said absorption chambers near the inlet thereof, an electrode mounted in each of said absorption chambers, and apertures in the walls thereof adjacent to said electrodes to provide for the relatively free flow of the solution from the main body of the cell into and out of the absorption chambers, said electrodes being connected in an electrical circuit that includes said aqueous solution, potential indicating means and a timer operating cyclically and alternately to energize said burner and disconnect said indicating means from the electrodes during part of a cycle, and to deenergize said burner and connect said indicating means to said electrodes during the remainder of the cycle.

12. In an apparatus for detection of the presence of carbon monoxide in the atmosphere, the combination of an absorber for removing acid anhydride gases from the air being analyzed, a bifurcated conduit connected with the outlet of said absorber for dividing the air flowing therefrom into two separate streams of substantially equal flow rates, a first fork of said bifurcated conduit connecting said absorber to the inlet of a combustion chamber, a burner located in said combustion chamber for causing any carbon monoxide, contained in the one of said streams of air that enters said combustion chamber, to form carbon dioxide, a cell having a main body adapted to contain an aqueous solution, two absorption chambers mounted in said cell, the second fork of said bifurcated conduit connecting with the inlet of one of said absorption chambers, a conduit connecting the combustion chamber to the inlet of the second absorption chamber, an air disperser in each of said absorption chambers near the inlet thereof, an electrode mounted in each of said absorption chambers, and apertures in the walls thereof adjacent to said electrodes to provide for the relatively free flow of the solution from the main body of the cell into and out of the absorption chambers, said electrodes being connected in an electrical circuit that includes said aqueous solution, potential indicating means and a timer operating cyclically and alternately to energize said burner and disconnect said indicating means from the electrodes during substantially one-half of a cycle, and to deenergize said burner and connect said indicating means to said electrodes during the remainder of the cycle.

13. A cell for the determination of the presence of a gaseous anhydride in air by electrically detecting a change in the ionic concentration of an aqueous solution when the anhydride is dissolved therein, comprising a container adapted to be partly filled with a dilute aqueous solution, a pair of tubular elements extending vertically from the bottom of the container, a disperser located at the bottom of each of said tubular elements for admitting thereinto a stream of air, an electrode comprising a metallic sheet of substantial surface area mounted in each of said tubular elements, and apertures located in the walls of said tubular elements adjacent to said electrodes to provide free communication for said solution between said container, said tubular elements and said electrodes.

14. In an apparatus for the detection of the presence of carbon monoxide in the atmosphere, the combination of an absorber for removing acid anhydride gases from the air being analyzed, a bifurcated conduit connected with the outlet of said absorber for dividing the air flowing therefrom into two streams having substantially equal flow rates, one fork of said bifurcated conduit connecting with the inlet of a combustion chamber, a burner located in said combustion chamber for burning any carbon monoxide in the one of said streams flowing into said combustion chamber to form carbon dioxide, a cell having a main body adapted to contain an aqueous solution, two absorption chambers mounted in said cell, the second fork of said bifurcated conduit connecting said absorber to the inlet of one of said absorption chambers, a conduit connecting the outlet of the combustion chamber to the inlet of the second absorption chamber, an electrode mounted in each of said absorption chambers, apertures in the walls of said absorption chambers adjacent to said electrodes to provide free communication of said aqueous solution between said cell and said absorption chambers, and an electrical circuit including said electrodes, said aqueous solution and electrical potential indicating means.

WILLIAM F. FAGEN.

REFERENCES CITED

The following references are of record in the file of this patent:

UNITED STATES PATENTS

| Number | Name | Date |
| --- | --- | --- |
| 870,675 | Guess et al. | Nov. 12, 1907 |
| 1,008,485 | Metzger | Nov. 14, 1911 |
| 1,236,000 | Neeley | Aug. 7, 1917 |
| 1,375,933 | Rideal et al. | Apr. 26, 1921 |
| 1,475,000 | Cooper et al. | Nov. 20, 1923 |
| 1,670,819 | Morris et al. | May 22, 1928 |
| 1,877,296 | Goldberg | Sept. 13, 1932 |
| 1,883,328 | Bihl et al. | Oct. 18, 1932 |
| 1,893,490 | Beekley | Jan. 10, 1933 |
| 1,931,135 | McLaughlin et al. | Oct. 17, 1933 |
| 2,079,601 | Canfield | May 11, 1937 |
| 2,149,441 | Jacobson | Mar. 7, 1939 |
| 2,160,326 | Carbonara | May 30, 1939 |
| 2,168,236 | Pick | Aug. 1, 1939 |
| 2,190,302 | Waldschmidt | Feb. 13, 1940 |
| 2,288,180 | Brengman et al. | June 30, 1942 |
| 2,354,915 | Granberg | Aug. 1, 1944 |

FOREIGN PATENTS

| Number | Country | Date |
| --- | --- | --- |
| 300,281 | Great Britain | Sept. 12, 1929 |
| 416,900 | Great Britain | Sept. 24, 1934 |
| 499,795 | France | Nov. 28, 1919 |